United States Patent
Sartini et al.

(10) Patent No.: US 8,924,562 B2
(45) Date of Patent: Dec. 30, 2014

(54) DYNAMIC POLICY GENERATION AND ASSIGNMENT

(75) Inventors: Robert A. Sartini, Colorado Springs, CO (US); Paul T. Schultz, Colorado Springs, CO (US); Mark J. Hahn, Stow, MA (US); Harrison Duong, Cambridge, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 411 days.

(21) Appl. No.: 13/161,971

(22) Filed: Jun. 16, 2011

(65) Prior Publication Data

US 2012/0324072 A1  Dec. 20, 2012

(51) Int. Cl.
 *G06F 15/173* (2006.01)
 *G06F 9/50* (2006.01)

(52) U.S. Cl.
 CPC .................................. *G06F 9/50* (2013.01)
 USPC ............................ 709/226; 709/217; 709/223

(58) Field of Classification Search
 CPC ............ H04L 41/5009; H04L 41/5006; H04L 41/5035; H04L 47/2425
 USPC ........................................ 709/217, 223–226
 See application file for complete search history.

(56) References Cited

U.S. PATENT DOCUMENTS

| | | | | |
|---|---|---|---|---|
| 7,467,192 B1 * | 12/2008 | Lemler et al. | | 709/223 |
| 7,496,655 B2 * | 2/2009 | Gopalan et al. | | 709/224 |
| 7,801,987 B2 * | 9/2010 | Grell et al. | | 709/224 |
| 8,156,222 B2 * | 4/2012 | Gingell et al. | | 709/224 |
| 8,285,836 B2 * | 10/2012 | Haga et al. | | 709/224 |
| 2005/0027863 A1 * | 2/2005 | Talwar et al. | | 709/226 |
| 2009/0307335 A1 * | 12/2009 | Bantz et al. | | 709/219 |
| 2010/0218104 A1 * | 8/2010 | Lewis | | 709/224 |
| 2011/0258317 A1 * | 10/2011 | Sinha et al. | | 709/226 |

* cited by examiner

*Primary Examiner* — Phuoc Nguyen

(57) ABSTRACT

A computing device receives a request for a service level agreement (SLA) that indicates a specific combination of services and service levels selected from a group of available services and available service levels. The computing device generates an SLA identifier for the specific combination of services and service levels, and determines if the SLA identifier matches one of a group of stored SLA identifiers. The computing device generates a new SLA based on the specific combination of services and service levels when the SLA identifier does not match one of the group of stored SLA identifiers, and assigns an existing SLA, corresponding to one of the group of stored SLA identifiers, when the SLA identifier matches one of the group of stored SLA identifiers.

20 Claims, 6 Drawing Sheets

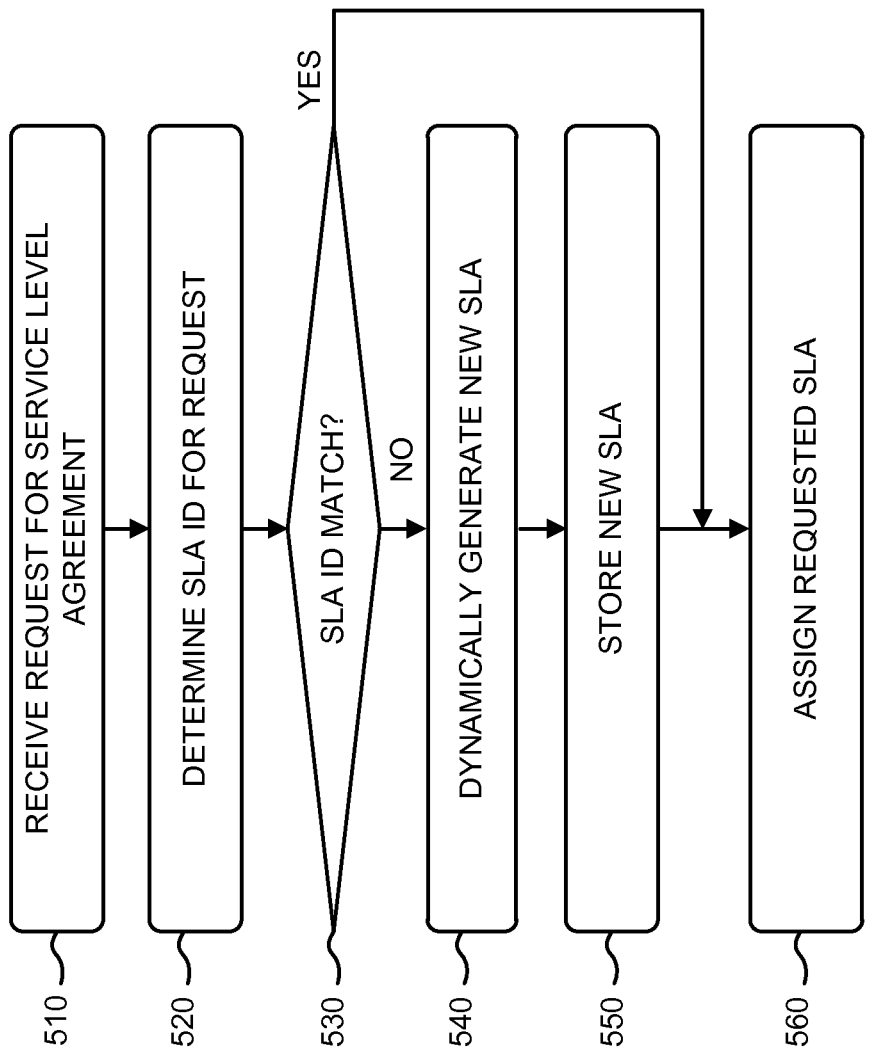

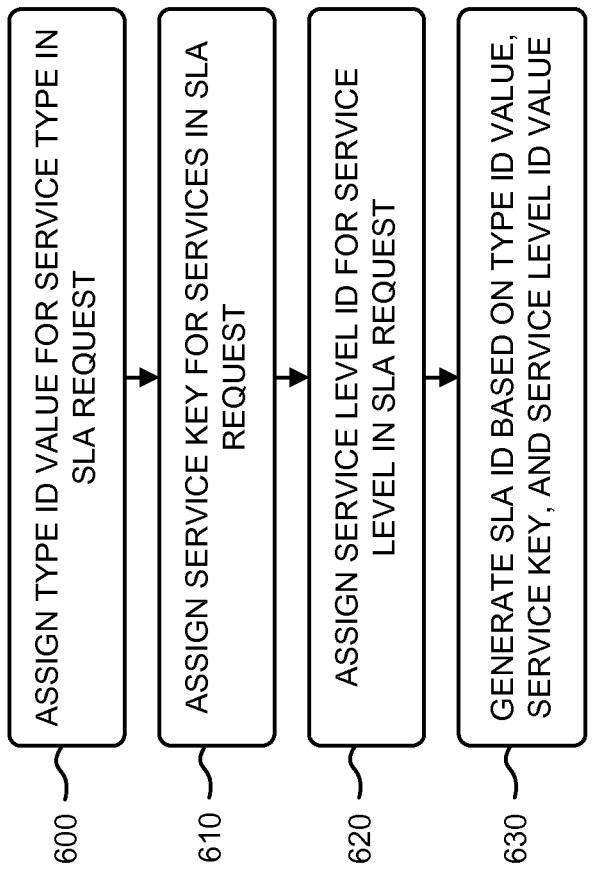

DYNAMIC POLICY GENERATION AND ASSIGNMENT

BACKGROUND

Network resource management addresses the need for ensuring that a particular network has appropriate resources to provide a customer with an intended quality of service. Current networks support different types of applications with different service requirements. Some applications require very strict commitment regarding resource availability for some or all of the corresponding traffic components. For example, services supporting applications that use audio and video components, along with mission critical tasks, particularly need a reliable system that ensures compliance with a service level agreement (SLA). When an application is first provisioned, the subscriber and service provider may agree on the average rate (and burstiness) of data transmission over the link. As long as the customer fulfills their part of the contract and transmits packets according to the SLA, the service provider attempts to deliver them in a timely manner.

BRIEF DESCRIPTION OF THE DRAWINGS

FIGS. 5 and 6 are flowcharts of an exemplary process for providing dynamic policy generation and assignment, according to an implementation described herein.

DETAILED DESCRIPTION OF PREFERRED EMBODIMENTS

The following detailed description refers to the accompanying drawings. The same reference numbers in different drawings may identify the same or similar elements.

With a large number of customers, services, and support levels, it becomes increasingly difficult to manually generate SLAs that are tailored to every customer's requirements. Thus, customers typically select from a limited set of SLAs that may include unwanted services and/or services levels in order to meet a customer's minimum requirements.

Systems and/or methods described herein may dynamically generate and assign appropriate service level agreement (SLA) policies based on specific customer requirements. In one implementation, the systems and/or methods may receive a request for an SLA that indicates a specific combination of services and service levels selected from a group of available services and available service levels (e.g., offered by a service provider). The systems and/or methods may generate an SLA identifier for the specific combination of services and service levels, and may determine if the SLA identifier matches one of a group of stored SLA identifiers. The systems and/or methods may dynamically generate a new SLA based on the specific combination of services and service levels when the SLA identifier does not match one of the group of stored SLA identifiers, and may assign an existing SLA, corresponding to one of the group of stored SLA identifiers, when the SLA identifier matches one of the group of stored SLA identifiers.

Figure 1:
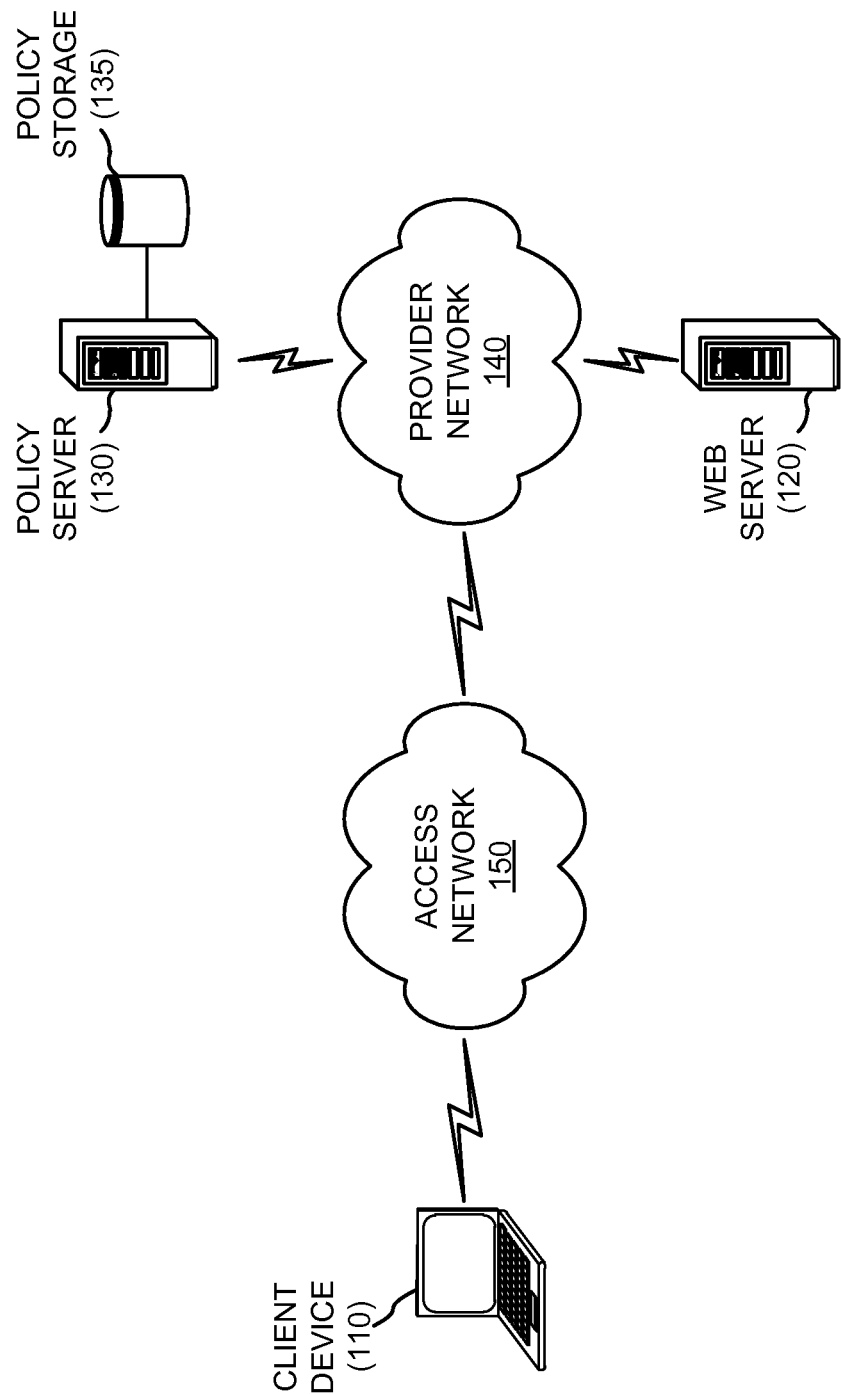
FIG. 1 is a diagram that illustrates an exemplary network in which systems and/or methods, described herein, may be implemented.

FIG. 1 is a diagram that illustrates an exemplary network 100 in which systems and/or methods described herein may be implemented. As shown in FIG. 1, network 100 may include a client device 110, a web server 120, a policy server 130, a policy storage device 135, a provider network 140, and an access network 150. Devices and/or networks of FIG. 1 may be connected via wired and/or wireless connections.

Client device 110 may include a personal computer, a laptop computer, a tablet or "pad" computer, a personal communications system (PCS) terminal (e.g., that may combine a cellular radiotelephone with data processing and data communications capabilities), a PDA (e.g., that can include a radiotelephone, a pager, Internet/intranet access, etc.), a smartphone, or other types of computation and/or communication devices. In one implementation, client device 110 may include any device (e.g., an IP-based device) that enables a user to access the Internet and/or communicate with web server 120.

Web server 120 may include one or more server devices, or other types of computation or communication devices, that gather, process, search, and/or provide information in a manner described herein. In one implementation, web server 120 may facilitate submission of SLA requests from client device 110 to policy server 130 and responses from policy server 130 to client device 110. Web server 120 may dynamically generate web pages for each client device 110 accessing web server 120. In one implementation, web server 120 may provide an interface to a customer services portal that allows for interactive customer input for multiple topics.

Policy server 130 may include one or more server devices, or other types of computation or communication devices, that gather, process, search, and/or provide information in a manner described herein. In one implementation, policy server 130 may receive, from client device 110 and/or web server 120, an SLA request with specific customer criteria. Policy server 130 may either match the SLA request to an existing SLA or dynamically generate a new SLA that matches the specific customer criteria. As described further herein, in one implementation, policy server 130 may generate unique SLA identifiers for each combination of services and service levels in an SLA to facilitate searching and automatic generation of SLA policies.

Policy storage 135 may include a storage device, such as a database or another memory component, that stores information received and/or generated by policy server 130. For example, policy storage 135 may store existing SLAs and/or SLA identifiers that policy server 130 may use to match to incoming SLA requests from client device 110/web server 120.

Provider network 140 may include a network that distributes or makes available services, such as, for example, Internet services, messaging services, television services, and/or mobile services. Provider network 140 may be a satellite-based network and/or a terrestrial-based network. Provider network 140 may include, for example, customer information servers (e.g., policy server 130), policy storage devices (e.g., policy storage 135), content storage/distribution devices, application servers, billing devices, security devices, etc.

Access network 150 may generally include a local area network (LAN), a wide area network (WAN), a metropolitan area network (MAN), a wireless network, an optical fiber (or fiber optic) network, a cable television network, a satellite television network, or a combination of networks. In one implementation, access network 150 may include an IP-based network. In some implementations, access network 150 may be a private network controlled by, for example, a telecommunications company that provides television, telephone, and/or data access to client device 110. In another implementation, access network 150 may be a public network, such as the Internet, or a combination of public and private networks.

According to an implementation herein, a web server 120 may provide an interface for a customer to submit (e.g., via client device 110) a request for an SLA. The interface may provide a group of available services and available service levels which the customer may select in different combinations. The customer may generate an SLA request with a specific combination of services and service levels selected from the group of available services and available service levels. Policy server 130 may receive the SLA request (either from client device directly or via web server 120) and compare the combination of services and service levels in the SLA request with existing SLAs in policy storage 135. If policy server 130 determines that the specific combination of services and service levels in the SLA request does not match any existing SLA in policy storage 135, policy server 130 may automatically generate a new SLA based on the specific combination of services and service levels and may assign the new SLA to the customer in response to the request for the SLA. If policy server 130 determines that the specific combination of services and service levels in the SLA request matches an existing SLA in policy storage 135, policy server may simply assign the existing SLA to the customer.

Components are illustrated in FIG. 1 for simplicity. In other implementations, network 100 may include fewer components, different components, differently arranged components, or additional components than depicted in FIG. 1. For example, there could be thousands of client devices 110. Also, in some instances, a component of network 100 may perform one or more functions described as being performed by another component or group of components of network 100.

Figure 2:
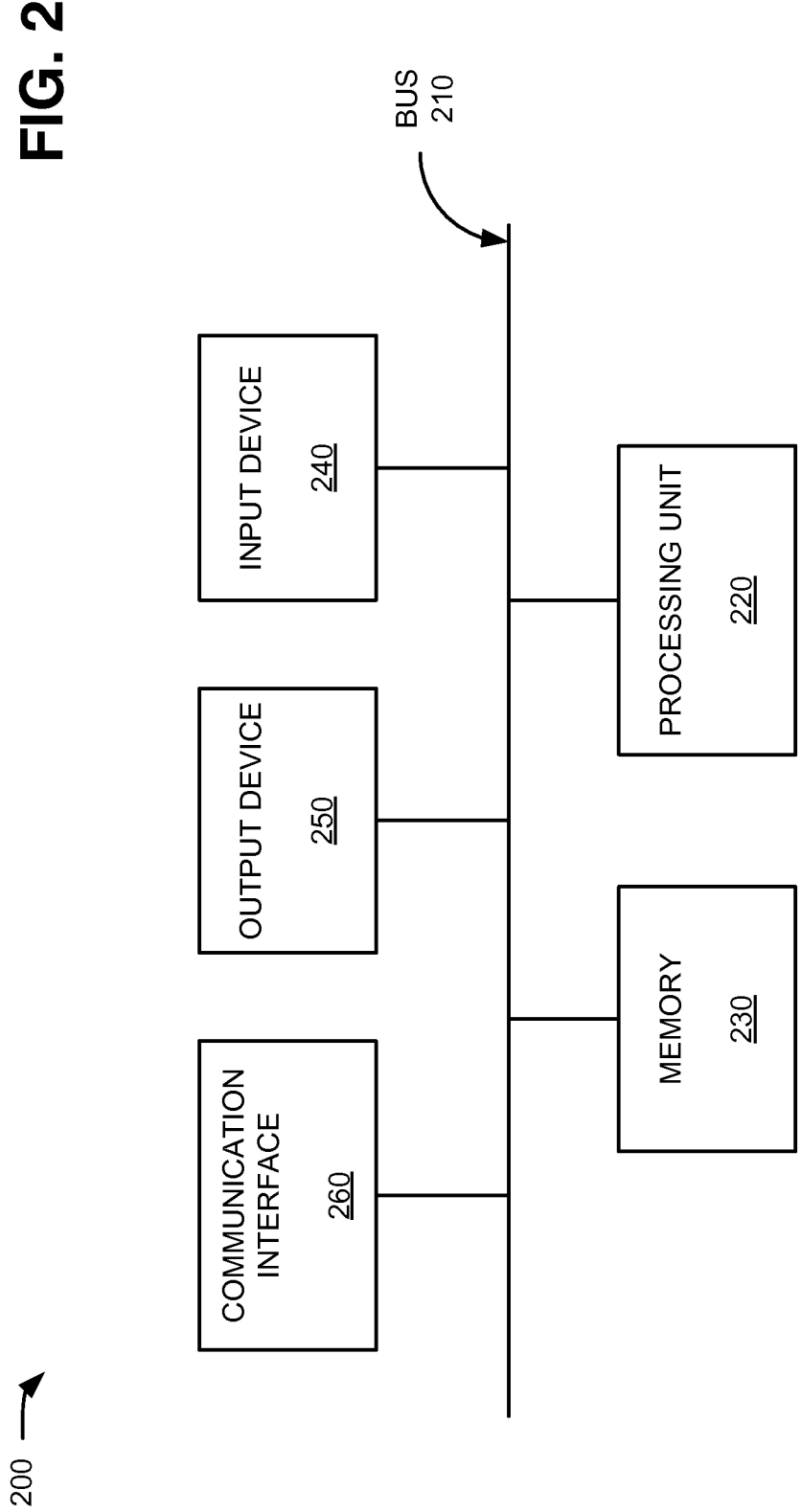
FIG. 2 is a diagram of exemplary components of a device that may be used within the environment of FIG. 1.

FIG. 2 is a diagram of exemplary components of a device 200. Device 200 may correspond to client device 110, web server 120, or policy server 130. Each of client device 110, web server 120, or policy server 130 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for execution by processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, or the like. Output device 250 may include a device that outputs information to the operator, such as a display, a speaker, etc.

Communication interface 260 may include a transceiver (e.g., a transmitter and/or receiver) that enables device 200 to communicate with other devices and/or systems. For example, communication interface 260 may include mechanisms for communicating with other devices, such as other devices of network 100 or another device 200.

As described herein, device 200 may perform certain operations in response to processing unit 220 executing software instructions contained in a computer-readable medium, such as memory 230. A computer-readable medium may include a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
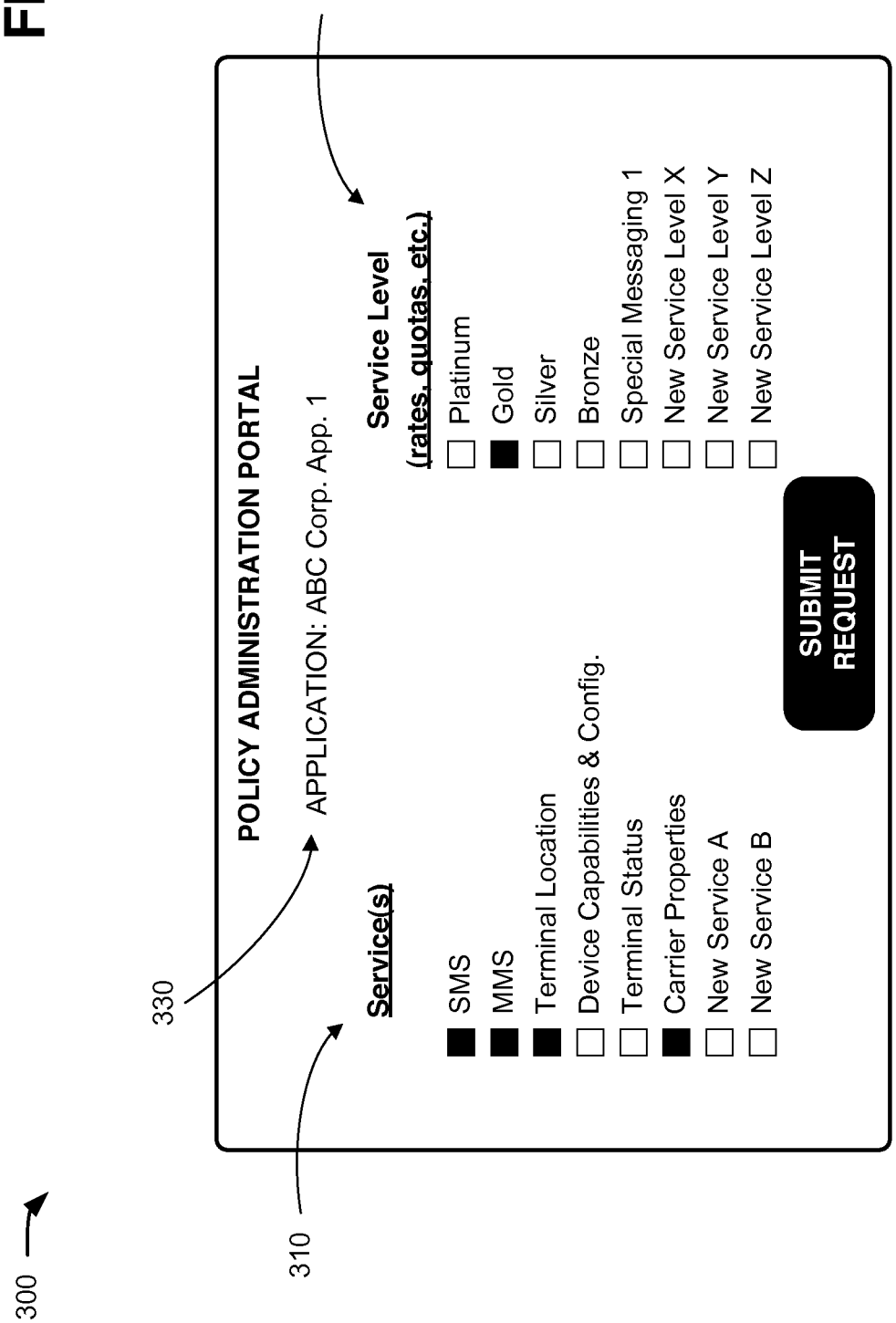
FIG. 3 is a diagram of an exemplary user interface for generating a policy assignment request.

FIG. 3 depicts a diagram of an exemplary user interface 300 for generating a policy assignment request. User interface 300 may be configured, for example, by web server 120 (e.g., using information from policy server 130). In one implementation, user interface 300 may be presented as an interactive web page on client device 110 that may be accessed via a web browser or another application. As illustrated, user interface 300 may include a list of services 310, a list of available service levels 320, and an agreement type identifier 330.

List of services 310 may include services (e.g., associated with provider network 140) that are available to be selected by a customer. Items in list of services 310 may be selected to support an application that a user of client 110 seeks to provide to users via provider network 140. As shown in FIG. 3, list of services 310 may include, for example, short messaging service (SMS), multimedia messaging service (MMS), terminal location (e.g., of user devices accessing provider network 140), device capabilities and configurations (e.g., of user devices accessing provider network 140), terminal status (e.g., connected/disconnected to provider network 140), carrier properties (e.g., data rates, etc.), and other services (e.g., "New Service A," "New Service B"). Each item in list of services 310 may include a selection mechanism, such as a radio button, checkbox, dropdown menu, etc., to allow a user of client device 110 to select different items and/or combinations of items.

List of available service levels 320 may include service levels (e.g., associated with provider network 140) that are available to be selected by a customer. A service level may represent defined sets of data rates, quotas, etc. ranging from a highest level (e.g., "Platinum") to a lowest level (e.g., "Bronze") or with particular characteristics (e.g., "Special Messaging 1"). A service provider may set values (e.g., data rates, quotas, etc.) for each service level in list of available service levels 320, such that selection of a service level by a customer represents a defined level of service. In one implementation, the values for service levels in list of available service levels 320 may be updated/changed dynamically. Dynamic changes may allow, for example, a service provider to increase the rates and/or quotas for all SLAs (e.g., both existing and future SLAs) that have particular service level (e.g., "platinum," "gold," etc.) without individually changing each SLA.

As shown in FIG. 3, a service level from list of available service levels 320 may be selected for a particular application (e.g., "ABC Corp. App. 1") and apply to all selected services (e.g., selected from list of services 310). In other implementations, a service level from list of available service levels 320 may be selected for each particular service (e.g., "SMS," "MMS," etc.) for an application. An item in list of available service levels 320 may be selected by a user of client device 110.

Agreement type identifier 330 may include a particular type of SLA. For example, SLAs may be distinguished as "application" SLAs or "administrative" SLAs. In one implementation, the type of SLA in agreement type identifier 330 may be selected by a customer. For example, agreement type identifier 330 may include a drop-down menu or another selection mechanism to select a type of SLA. In other implementations, the type of SLA may be limited and/or automatically assigned based on account privileges/restrictions for a particular customer.

Each possible combination of selected items from list of services 310, list of available service levels 320, and/or agreement type identifier 330 may represent a different SLA policy for a customer application. As described further herein, a particular combination of services and service level(s) (and possibly agreement types) may be selected by a user of client device 110 and may be provided to policy server 130 as an SLA request.

Although FIG. 3 shows an exemplary user interface 300, in other implementations, user interface 300 may contain different and/or additional items than depicted in FIG. 3.

Figure 4:
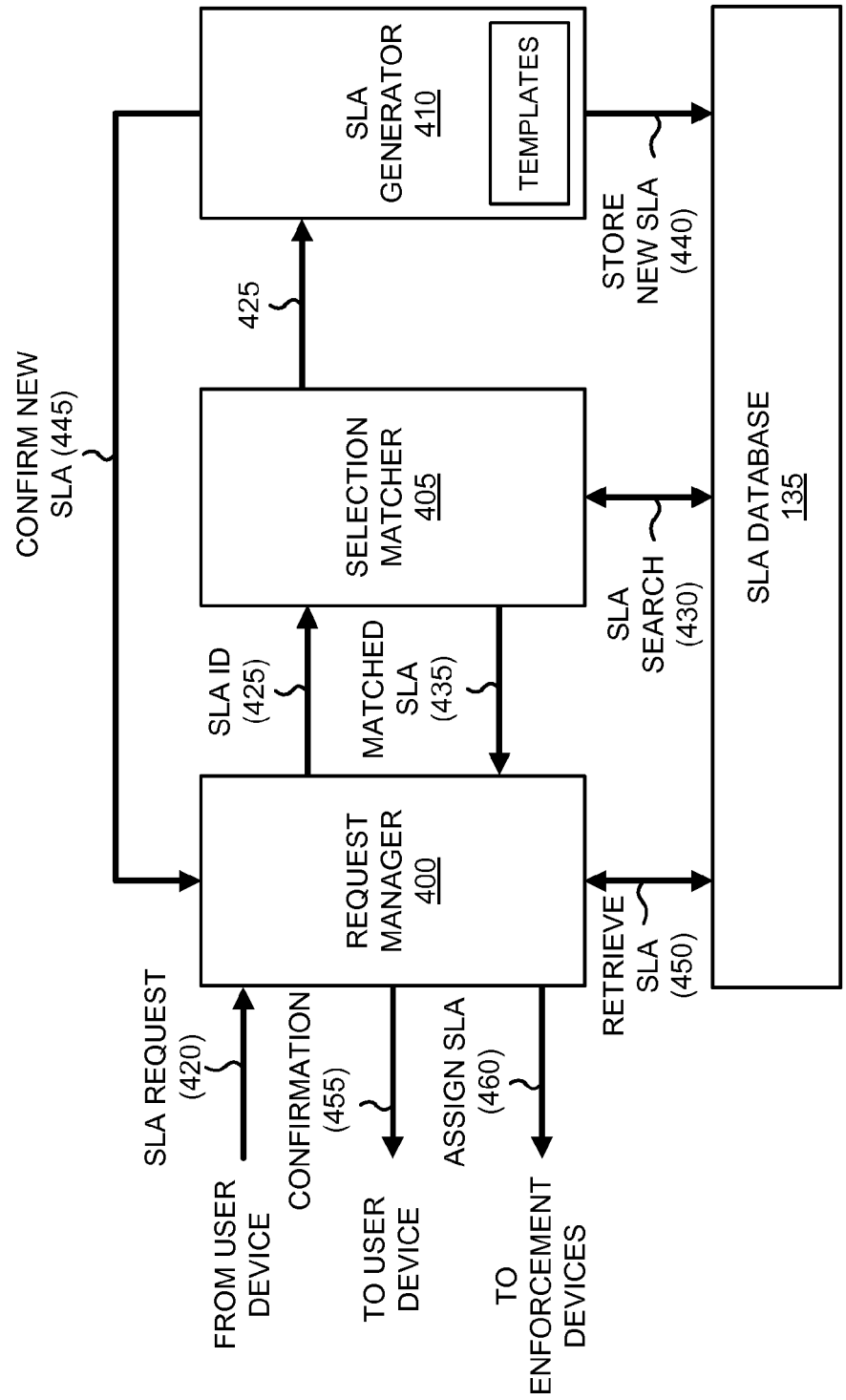
FIG. 4 is a diagram of exemplary functional components of the policy server of FIG. 1.

FIG. 4 is a diagram of exemplary functional components of policy server 130. In one implementation, the functions described in connection with FIG. 4 may be performed by one or more components of device 200 (FIG. 2). As shown in FIG. 4, policy server 130 may include SLA database 135, a request manager 400, a selection matcher 405, and a SLA generator 410. SLA database 135 may include features described above with respect to, for example, FIG. 1.

Request manager 400 may receive an SLA request and format the SLA request into a searchable format. For example, request manager 400 may receive, from client device 110 (e.g., via web server 120), an SLA request 420 generated via user interface 300. SLA request 420 may include a particular combination of services and service levels.

In one implementation, request manager 400 may format SLA request 420 into a unique numerical name, also referred to herein as an SLA identifier. The unique numerical name may be a combination of a type identifier, a service key identifier, and a service level identifier. Thus, the SLA identifier may be based on what services are configured in the SLA and the level of service assigned. The SLA name may be in the format:

<TypeID>_<ServiceKey>_<ServiceLevelID> where TypeID is the type identifier, ServiceKey is the service key, and ServiceLevelID is the service level identifier.

The type identifier (e.g., selected from agreement type identifier 330) may differentiate between SLA types (e.g., "application" or "administrative"). For example, an application SLA type may be designated with a "1," and an administrative SLA type may be designated with a "2."

For the service key, each service (e.g., in list of services 310) may be assigned a bit position (e.g., for a binary number). As new services get deployed, the new service 'bit' would allow a union with any other set of services. Service bit position assignments may result in a largest possible value of $2^n-1$, where n is the number of services available for selection. Referring to the sample services in list of services 310 (FIG. 3), service bit position assignments may be assigned as SMS=1, MMS=2, Terminal Location=4, Device Capabilities & Configuration=8, Terminal Status=16, Carrier Properties=32, New Service A=64, and New Service B=128. Thus, for the total number (e.g., eight) of available services, the largest numeric value if all services were selected would be 255 (e.g., $2^8-1$, or 11111111 in binary format). As another example, the combination of SMS, MMS, and New Service A would result in a service key of 67 (e.g., 01000011 in binary format).

In order to further increase the number of services (e.g., in list of services 310) made available to customers, the service key would be parsed into a long value. This would allow for 63 services (given that a standard maximum long value is 2 to $63^{rd}$ power $-1$). If more than 63 services were to be supported, the SLA identifier may be configured to include multiple service key terms. For example, every term in the SLA identifier after the first (e.g., the TypeID) and before the last (e.g., the ServiceLevelID) could be considered a service key. So, if there were 64 services and all were selected, the SLA identifier could be 1_1_9223372036854775807_3, where TypeID=1, ServiceKey=1_9223372036854775807, and ServiceLevelID=3.

For the service level identifier, service levels (e.g., in list of available service levels 320) may be identified by a name assigned to them. Initially, there could be a set number of levels (e.g., four or five service levels), and the number of service levels may later be expanded. Service levels may be assigned an identification number. Referring to the sample services in list of available service levels 320, identification numbers may be assigned as Bronze=1, Silver=2, Gold=3, Platinum=4, and Special Messaging=5. No values may be assigned to unused service levels (e.g., New Service Level X, New Service Level Y, New Service Level Z). Actual data rates and/or quotas associated with a selected service level may be assigned inside the corresponding SLA.

Request manager 400 may receive SLA request 420 and may assign a type identifier, a service key, and a service level identifier to generate a unique numerical name for the requested SLA. Given the sample selections shown in FIG. 3 (e.g., type=Application; services=SMS, MMS, Terminal Location, and Carrier Properties; service level=Gold) and the identification assignments given above, request manager 400 may assign TypeID=1, ServiceKey=00100111 (binary)=39 (decimal), and ServiceLevelID=3. Thus, Request manager 400 may assign the sample selections shown in FIG. 3 with an SLA identifier of "1_39_3." Request manager 400 may forward the assigned SLA identifier to selection matcher 405, as indicated by reference number 425.

Selection matcher 405 may receive SLA identifier 425 and determine if SLA identifier 425 (e.g., corresponding to SLA request 420) corresponds to an existing SLA. For example, selection matcher 405 may perform a search 430 of SLA database 135 to see if SLA identifier 425 is already stored. If SLA identifier 425 is already stored in SLA database 135, selection matcher 405 may reply to request manager 400 with a matched SLA confirmation 435. If selection matcher 405 does not find a stored match for SLA identifier 425 in SLA database 135, selection matcher 405 may forward SLA identifier 425 to SLA generator 410.

SLA generator 410 may receive SLA identifier 425 and may create a new SLA based on the selected type of SLA (e.g., as indicated by the TypeID of SLA identifier 425), the selected services (e.g., as indicated by the "1" bits in the binary representation of the ServiceKey of SLA identifier 425), and service level (e.g., as indicated by the ServiceLevelID of SLA identifier 425). In one implementation, SLA generator 410 may include a database (e.g., part of memory 230) of template language that corresponds to each service in list of services 310, each service level in available service levels 320, and a general template structure. Based on SLA identifier 425, SLA generator 410 may extract corresponding template language to generate a SLA. For example, SLA generator 410 may apply, to the general template structure, template language for each selected service and/or service level identified in SLA identifier 425 to automatically generate a service level agreement.

Templates in SLA generator 410 may include standard policy language and language associated with each service/service level available to be selected. Template language may be provisioned by a service provider (e.g., a network administrator) and stored in SLA generator 410 in advance of receiving SLA identifier 425. For example, a service provider may use communication interface 260 and/or input device 240 to provide template language to SLA generator 410. SLA generator 410 may also receive changes/updates to the template language. Changes to template language in SLA generator 410 may be included in new SLAs generated by SLA generator 410. Additionally, received template changes may be linked to existing SLAs stored in SLA database 135 to allow for dynamic updates of SLAs in SLA database 135.

In one implementation, SLA generator may apply template language for the specific combination of services and service levels to create a new SLA. SLA generator 410 may store the newly-generated SLA in SLA database 135, as indicated by reference number 440. To allow for future retrieval and/or searching, the stored SLA may be given the file name of SLA identifier 425, or otherwise be associated with SLA identifier 425. SLA generator 410 may also provide a new SLA confirmation 445 to request manager 400.

Request manager 400 may receive matched SLA confirmation 435 or new SLA confirmation 445 and may retrieve, from SLA database 135, the SLA corresponding to SLA identifier 425, as indicated by reference number 450. Request manager 400 may send confirmation 455 (e.g., with the SLA) to the requesting client device 110 (e.g., via web server 120). Request manager 400 may also send an assignment signal 460 to enforcement devices (e.g., within provider network 140) to implement the SLA for the particular application/client.

In one implementation, request manager 400 may also verify compatibility of the combination of services and service levels included in SLA request 420, if a corresponding SLA did not previously exist (e.g., is not identified by selection matcher 405). For example, based on new SLA confirmation 445, request manager 400 may determine whether the specific combination of services and service levels indicated in the request appears valid and/or logically compatible. For example, selection of a particular service level from list of available service levels 320 (e.g., "Special Messaging 1") may not be relevant if particular services from list of services 310 (e.g., "SMS" or "MMS") are also selected.

If request manager 400 determines that the combination of services and service levels included in SLA request 420 may be illogical and/or invalid, and if that combination does not exist as a stored SLA (e.g., in SLA database 135), request manager 400 may provide, to client device 110, a suggested alternative combination of services and service levels. The suggested alternative may be included, for example, with or in place of confirmation 455.

Although FIG. 4 shows exemplary functional components of policy server 130, in other implementations, policy server 130 may include fewer, different, differently-arranged, and/or additional functional components than depicted in FIG. 4. Alternatively, or additionally, one or more components of policy server 130 may perform one or more other tasks described as being performed by one or more other components of policy server 130.

FIGS. 5 and 6 are flowcharts of an exemplary process 500 for providing dynamic policy generation and assignment, according to an implementation described herein. In one implementation, process 500 may be performed by one or more components of policy server 130, such as one or more processing units 220. In another implementation, one or more blocks of process 500 may be performed by one or more other devices or a group of devices including or excluding policy server 130.

Process 500 may include receiving a request for a service level agreement (block 510) and determining an SLA identifier for the request (block 520). For example, as described in connection with FIG. 4, request manager 400 may receive, from client device 110 (e.g., via web server 120), an SLA request 420 generated via user interface 300. SLA request 420 may include a particular combination of services and service levels. In one implementation, request manager 400 may format SLA request 420 into a unique numerical name, such as SLA identifier 425. The unique numerical name may be assigned as a combination of a type identifier, a service key identifier, and a service level identifier.

Process 500 may also include determining if a match exists for the SLA ID (block 530). For example, as described above in connection with FIG. 4, selection matcher 405 may receive SLA identifier 425 and determine if SLA identifier 425 (e.g., corresponding to SLA request 420) corresponds to an existing SLA. In one implementation, selection matcher 425 may perform search 430 of SLA database 135 to see if SLA identifier 425 is already stored.

If there is no match for the SLA ID (block 530—NO), a new SLA may be automatically generated (block 540), and the new SLA may be stored (block 550). For example, as described above in connection with FIG. 4, if selection matcher 405 does not find a stored match for SLA identifier 425 in SLA database 135, selection matcher 405 may forward SLA identifier 425 to SLA generator 410. SLA generator 410 may receive SLA identifier 425 and may create a new SLA based on a selected type of SLA (e.g., as indicated by the TypeID of SLA identifier 425), selected services (e.g., as indicated by the "1" bits in the binary representation of the ServiceKey of SLA identifier 425), and a service level (e.g., as indicated by the ServiceLevelID of SLA identifier 425). SLA generator 410 may apply templates for each selected service and/or service level to automatically generate a service level agreement. SLA generator 410 may store the newly-generated SLA in SLA database 135 (or another memory component), as indicated by reference number 440, to allow for future retrieval and/or searching. SLA generator 410 may also provide a new SLA confirmation 445 to request manager 400.

If there is a match for the SLA ID (block 530—YES) or after a new SLA is generated, process 500 may also include assigning the requested SLA (block 560). For example, as described above in connection with FIG. 4, if SLA identifier 425 is already stored in SLA database 135, selection matcher 405 may reply to request manager 400 with a matched SLA confirmation 435. Alternatively, SLA generator 410 may provide a new SLA confirmation 445 to request manager 400. Request manager 400 may receive matched SLA confirmation 435 or new SLA confirmation 445 and may retrieve, from SLA database 135, the SLA corresponding to SLA identifier 425, as indicated by reference number 450. Request manager 400 may send confirmation 455 (e.g., with the SLA) to the requesting client device 110 (e.g., via web server 120). Request manager 400 may also send assignment signal 460 to enforcement devices (e.g., within provider network 140) to implement the SLA for the particular application/client.

Process block 520 may include the process blocks depicted in FIG. 6. As shown in FIG. 6, process block 520 may include assigning a TypeID value for a service type identified in the SLA request (block 600), assigning a service key for the services included in the SLA request (block 610), and assigning a service level ID value for a service level identified in the SLA request (block 620). For example, as described above in connection with FIG. 4, request manager 400 may receive SLA request 420 and may assign a type identifier, a service key, and a service level identifier to generate a unique numerical name for the requested SLA. The type identifier (e.g., selected from agreement type identifier 330) may differentiate between, for example, SLA types (e.g., "application" or "administrative"). For example, an application SLA type may be designated with a "1," and an administrative SLA type may be designated with a "2." For the service key, each service (e.g., in list of services 310) may be assigned a bit position (e.g., for a binary code). As new services are deployed, their 'bit' would allow a union with any other set of services. Service bit position assignments may result in a largest possible value of $2^n-1$, where n is the number of services available for selection. For the service level identifier, service levels (e.g., in list of available service levels 320) may be identified by a name assigned to them. Initially, there could be a set number of levels (e.g., four or five service levels), and the number of service levels may later be expanded. Service levels may be assigned an identification number.

Process block may further include generating an SLA identifier based on the TypeID value, service key, and service level ID value (block 630). For example, as described above in connection with FIG. 4, SLA identifier 425 may be assigned as a combination of a type identifier, a service key identifier, and a service level identifier. The SLA name may be based on the enablers that are configured in it and the level of service assigned. The SLA name may be in the format: <TypeID>_<ServiceKey>_<ServiceLevelID>, where TypeID is the type identifier, ServiceKey is the service key, and ServiceLevelID is the service level identifier.

Systems and/or methods described herein may provide a user interface to generate an SLA request for specific combinations of services and/or service levels. The systems and/or methods may store existing SLA policies (e.g., with combinations of services and service levels used by other customers). The systems and/or methods may receive an SLA request with a specific combination of services and service levels and may determine that the specific combination of services and service levels does not match any stored SLA policies. The systems and/or methods may generate and assign a new SLA based on the specific combination of services and service levels when a stored SLA does not match the specific combination of services and service levels.

The systems and/or methods described herein may provide the ability to dynamically generate and assign appropriate SLA policies based on specific customer requirements. The systems and/or methods may enable network administrators to easily assign appropriate SLA policies via a web portal. Existing SLAs may be stored and re-used. The systems and/or methods may allow for efficient searching for appropriate SLAs based on specific combinations of services and service levels identified by customers. Customers may add new services and/or new service levels without requiring manual intervention by network providers. Furthermore, the systems and/or methods can accommodate inclusion of new services by network providers.

The foregoing description provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5 and 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, by a computing device, a request for a service level agreement (SLA), wherein the request indicates a specific combination of services and service levels selected from a group of available services and available service levels;
   generating, by the computing device, a unique SLA name, that is derived from the specific combination of services and service levels;
   determining, by the computing device and based on the unique SLA name, that the specific combination of services and service levels in the request does not match one of a group of previously-stored SLAs;
   generating, by the computing device, a new SLA based on the specific combination of services and service levels when the specific combination of services and service levels do not match one of the group of previously-stored SLAs; and assigning, by the computing device and to a customer, the new SLA in response to the request for the SLA.

2. The method of claim 1, wherein determining that the specific combination of services and service levels in the request does not match a stored SLA includes:
conducting, by the computing device, a search for the unique SLA name in a database of previously-stored SLA names.

3. The method of claim 2, wherein generating the unique SLA name includes:
assigning a service key for the services in the request for the SLA,
assigning a service level identifier for the service level in the request for the SLA, and
combining the service key and the service level identifier in a numerical name.

4. The method of claim 3, wherein assigning the service key includes:
identifying a unique binary code bit position for each service in the group of available services, and
assigning a positive value to the unique bit position corresponding to each of the services in the request for the SLA.

5. The method of claim 1, further comprising:
storing, in a database, the new SLA.

6. The method of claim 1, further comprising:
sending a SLA assignment confirmation to a client device that generated the request for the SLA.

7. The method of claim 1, further comprising:
storing, in a database, the unique SLA name associated with the new SLA.

8. The method of claim 1, further comprising:
receiving, by the computing device, a different request for a different SLA, wherein the different request indicates a different specific combination of services and service levels selected from the group of available services and available service levels;
generating, by the computing device, a different unique SLA name for the different specific combination of services and service levels;
determining, by the computing device and based on the different unique SLA name, that the different specific combination of services and service levels matches one of the group of previously-stored SLAs; and
assigning, by the computing device, the one of the group of previously-stored SLAs in response to the different request for the different SLA.

9. The method of claim 1, wherein generating the new SLA based on the specific combination of services and service levels comprises:
applying template language for the specific combination of services and service levels.

10. A computing device, comprising:
a memory to store a plurality of instructions; and
a processor configured to execute instructions in the memory to:
receive a request for a service level agreement (SLA), wherein the request indicates a specific combination of services and service levels selected from a group of available services and available service levels,
generate a SLA name that is unique for the specific combination of services and service levels and that is derived from the specific combination of services and service levels,
determine if the SLA name matches one of a group of previously-stored SLA names,
generate a new SLA based on the specific combination of services and service levels when the SLA name does not match one of the group of previously-stored SLA names, and
assign an existing SLA, corresponding to one of the group of previously-stored SLA names, when the SLA name matches one of the group of previously-stored SLA names.

11. The computing device of claim 10, wherein, when generating the SLA name for the specific combination of services and service levels, the processor is further configured to:
assign a service key for the services in the SLA request,
assign a service level identifier for the service level in the request for the SLA, and
combine the service key and the service level identifier in a numerical name.

12. The computing device of claim 11, wherein, when assigning the service key for the services in the SLA request, the processor is further configured to:
identify a unique binary code bit position for each service in the group of available services, and
assign a positive value to the unique bit position corresponding to each of the services in the request for the SLA.

13. The computing device of claim 10, wherein the processor is further configured to:
send a SLA assignment confirmation to a client device that generated the request for the SLA.

14. The computing device of claim 10, wherein, when the SLA name does not match one of the group of previously-stored SLA names, the processor is further configured to:
store the SLA name and the new SLA with the group of previously-stored SLA names.

15. The computing device of claim 10, wherein the processor is further configured to:
assign the new SLA in response to the request for the SLA when the SLA name does not match one of the group of previously-stored SLA names.

16. The computing device of claim 10, wherein the processor is further configured to:
receive, from a user, another SLA name that includes a different service key and a different service level identifier, and
identify, based on the other SLA name, particular services and a particular service level corresponding to the other SLA identifier.

17. The computing device of claim 10, wherein the processor is further configured to:
determine whether the specific combination of services and service levels indicated in the request are valid, and
provide, to a client device that generated the request, an alternative combination of services and service levels.

18. A system, comprising:
a first network device configured to:
provide an interface for a customer to submit a request for a service level agreement (SLA), wherein the interface includes a group of available services and available service levels which can be selected in different combinations, and
accept, from a customer device, the request for the SLA wherein the request indicates a specific combination of services and service levels selected from the group of available services and available service levels;

a database configured to store existing SLAs, wherein the existing SLAs include different combinations of services and service levels; and a second network device configured to:
  receive the request for the SLA,
  generate a SLA name that is derived from the specific combination of services and service levels;
  determine, based on the SLA name, that the specific combination of services and service levels in the request does not match any existing SLA stored in the database;
  automatically generate a new SLA based on the specific combination of services and service levels; and
  assign the new SLA to the customer in response to the request for the SLA.

19. The system of claim 18, wherein the second network device is further configured to:
  store, in the database, the new SLA.

20. The system of claim 18, wherein the database is further configured to store a different SLA name that corresponds to the different combinations of services and service levels in each existing SLA.

\* \* \* \* \*